Jan. 18, 1966     NAI-CHONG CHANG     3,229,529
ROTATING HELIX DOUBLE INTEGRATING ACCELEROMETER
Filed July 27, 1962     3 Sheets-Sheet 1
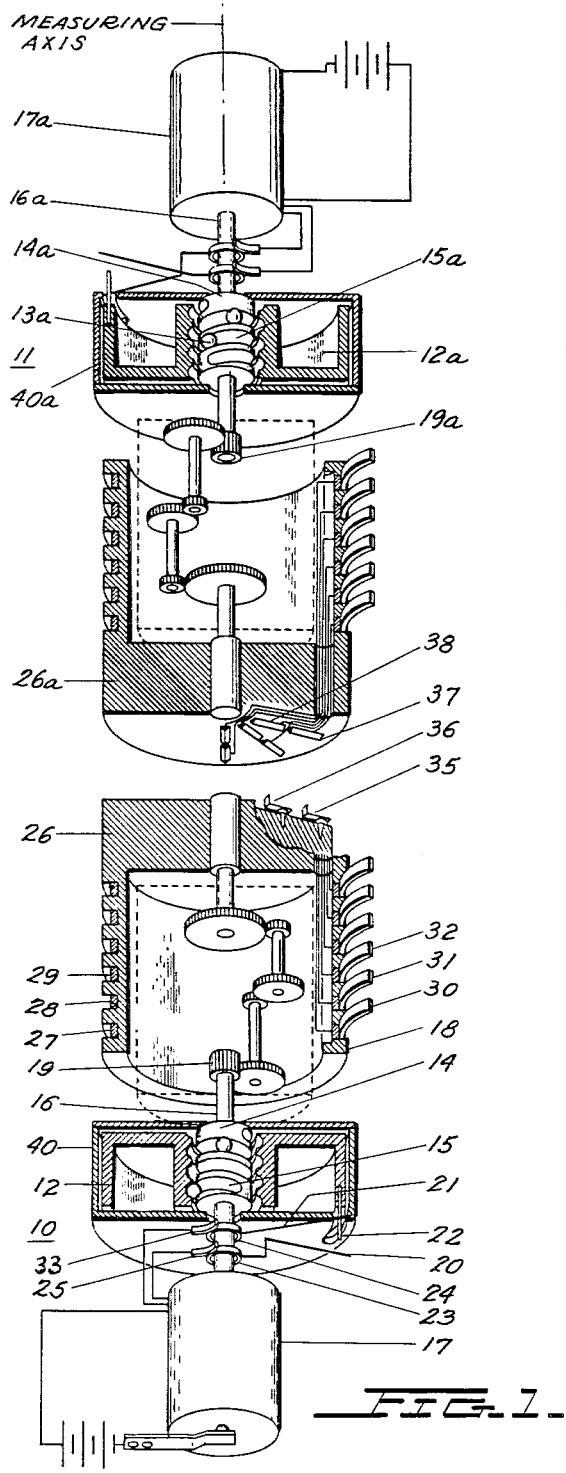
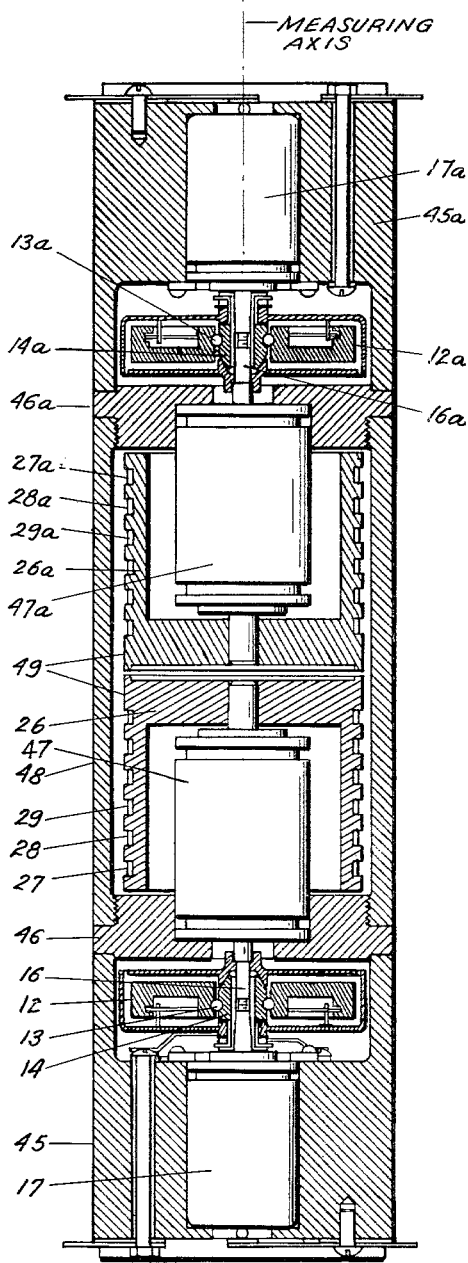
INVENTOR.
NAI-CHONG CHANG
BY Raymond R. Skolnick

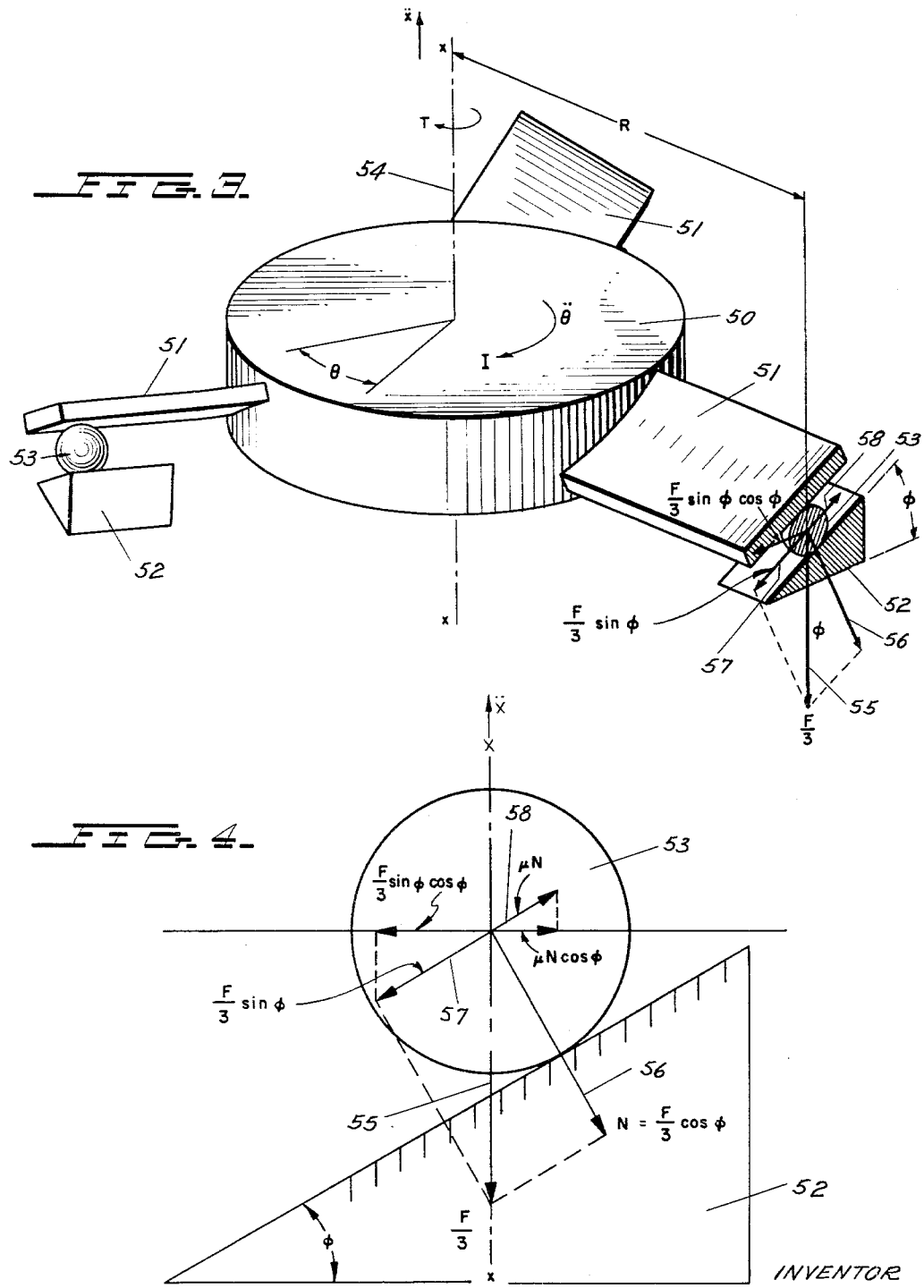

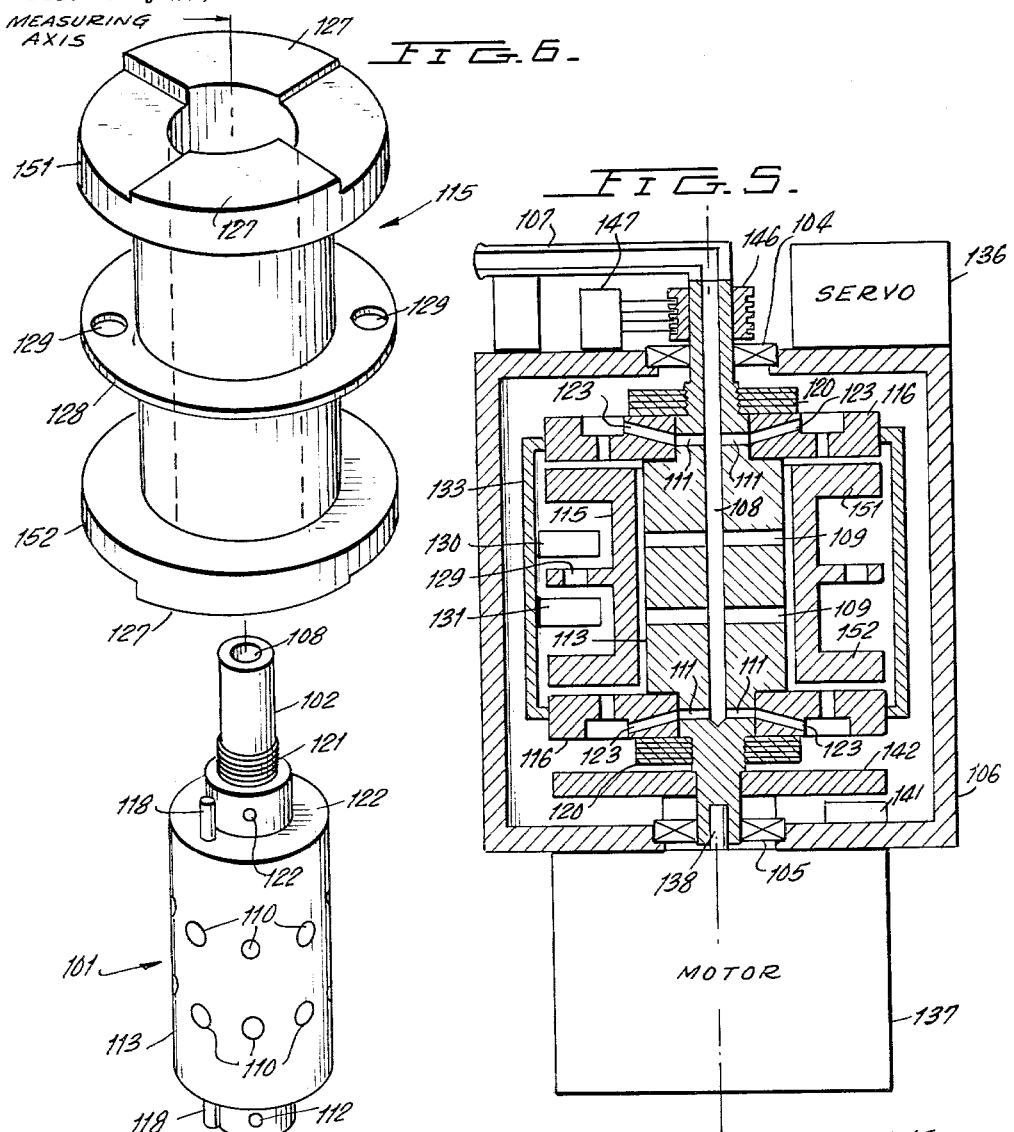

United States Patent Office 3,229,529
Patented Jan. 18, 1966

3,229,529
ROTATING HELIX DOUBLE INTEGRATING
ACCELEROMETER
Nai-Chong Chang, New Rochelle, N.Y., assignor to Sperry Rand Corporation, Ford Instrument Company Division, Long Island City, N.Y., a corporation of Delaware
Filed July 27, 1962, Ser. No. 212,888
1 Claim. (Cl. 73—490)

This invention generally relates to accelerometers and is specifically concerned with electromechanical acceleration responsive devices that are inherently capable of performing a double integrating function to provide an output signal proportional to distance traveled.

In many applications involving the guidance and control of moving vehicles, the timing of events, and others there is employed small and lightweight acceleration sensitive devices that are capable of high accuracy and rapid response to small changes in accelerational forces. For example, in inertially guiding a moving vehicle or inertially controlling various of its functions independently of external commands, it has become customary to control the vehicle or its functions by integrating the detected acceleration signals to provide the velocity of the vehicle and/or doubly integrating the signal to obtain the distance traveled by the vehicle, either or both of these quantities being thereafter employed to provide signals for initiating various other control and guidance functions. As the heart of such systems, the accelerometer is one of the vital parts and its sensitivity, accuracy, and dependability determines that of the overall system.

In recent years the trend in constructing such instruments has been to improve performance characteristics by the use of complex air bearings or various fluid type floating suspension which are employed to support the inertia responsive mass in a more frictionless manner. The incorporation of these friction reducing mechanisms, however, has resulted in the instrument becoming highly complex and costly to manufacture as well as being delicate and subject to error and misalignment when exposed to any rough handling and shock.

In addition to these disadvantages most known accelerometer devices of these types are not capable of inherently integrating the acceleration produced signal to provide the needed velocity and distance signals and therefore the system requires the addition of separate integrator devices. These separate integrator devices further add to the complexity and cost as well as increasing the overall size and weight of the unit required as well as enabling independent sources of error to be introduced into the inertial system.

According to the present invention there is provided an accelerometer mechanism that eliminates the need for highly complex and delicate bearing and support structures of this type yet provides an instrument of comparable performance that may be more easily manufactured and used. To perform these and other desirable functions the accelerometer of the present invention generally employs an inertial mass that is supported for combined rotative movement about its sensitive axis and axial movement along this axis responsively to acceleration produced forces. The support means is generally embodied in the form of an inclined surface, such as is provided by a helical guideway, tilted in the direction of the acceleration responsive axis. In this manner, by proper selection of the angle of inclination, the frictional force impeding the movement of the mass with respect to the inclined surface is substantially overcome. Therefore, the mass will move in this system regardless of how small the magnitude of the acceleration forces on the mass, thereby enabling the mass to sensitively respond to very small accelerations by rotating and axially moving with respect to the helical guideway surfaces. Among the advantages of this novel inclined surface supported accelerometer system is the fact that delicate and highly precise air bearings, liquid suspensions or other antifriction expedients of the nature are not required and ball bearings or similarly available rolling surface supports may be employed that are substantially insensitive to shock and rough handling.

It is accordingly a principal object of the invention to provide a double integrating accelerometer of reduced size and weight and improved sensitivity and accuracy for determining distance traveled through inertial determinations of variations in acceleration.

A further object of the invention is to provide such an accelerometer that may be employed on a high speed moving vehicle and that is highly sensitive to minor variations in acceleration of the body to accurately measure distance.

Still another object is to provide such an accelerometer that is compensated against spurious variations due to cross accelerations.

Still another object is to provide such an accelerometer that is compensated against spurious variation occasioned by rotation or spin of the vehicle about the sensitive axis of the accelerometer.

Still another object of the invention is to provide such an accelerometer that does not employ complex air bearing or fluid suspension, and thus is subject to frictional forces yet is sensitive to small changes in acceleration despite such forces.

A still further object is to provide such an accelerometer mechanism having a minimum of moving parts and that may be more easily manufactured, assembled and handled without unduly precise adjustment or alignment.

Another object of the invention is to provide such an accelerometer wherein the inertial mass is not delicately suspended or supported permitting the mechanism to withstand rough handling and shock.

While the discussion heretofore has been limited to an accelerometer utilizing helical surfaces and ball bearings as the sole means for supporting the inertia weight of the accelerometer, for certain applications it has been found advantageous to utilize air bearing supports. Thus, this application also includes an embodiment in which the rotating helix double integrating principal is extended to an accelerometer construction utilizing air bearings.

Accordingly, another primary object of this invention is to provide a novel construction for a double integrating accelerometer utilizing air bearings.

Yet another object is to provide an accelerometer construction in which helical thrust bearing surfaces are provided in cooperation with air under pressure to provide bearing support for the inertia weight.

Other objects and additional advantages will be more readily understood by those skilled in the art after a detailed consideration of the following specification taken with the accompanying drawing wherein:

FIG. 1 is a schematic view, partially in section and partially in perspective, illustrating one preferred embodiment of the invention;

FIG. 2 is a cross sectional view on a preferred accelerometer construction mounted within its supporting and enclosing housing, and FIGS. 3 and 4 are schematic diagrams of a functional nature for illustrating the principles and mode of operation of the invention.

FIGURE 5 is a longitudinal cross section of another embodiment of this invention in which the inertia weight is supported on air bearings. In FIGURE 5 internal control wiring has been eliminated so as not to obscure the relationships between the various mechanical elements comprising the instant invention.

FIGURE 6 is a perspective of the inertia mass or sensing element.

FIGURE 7 is a perspective of the shaft and journal bearing about which the inertia mass of FIGURE 6 rotates.

FIGURE 8 is a perspective of the lower helical thrust bearing pad of FIGURE 5.

Referring now to FIG. 1 for a detailed consideration of one preferred embodiment of the invention, there is shown an integrating accelerometer construction having left and right portions 10 and 11, respectively, that are each substantially identical in structure and mode of operation.

Considering the left hand section 10, it is preferably comprised of an acceleration responsive mass or inertia wheel 12 that is freely supported by means of ball bearings 13 or the like on a helically configured cylindrical support means 14. As shown, the ball bearings 13, located within the hub portion of the inertia wheel 12, are adapted to ride within a helical groove 15 provided in the cylindrical supported means 14 whereby the inertia wheel 12 is guided to jointly rotate about its own central axis and travel lengthwise along this axis in the manner of a threaded nut traveling on a bolt.

The cylindrical support means 14 is in turn suitably fastened on an elongated shaft 16 extending along the central axis of both the inertial wheel 12 and cylindrical helix support 14.

A motor 17 is provided at one end of shaft 16 to rotate the shaft 16 and a gear reducing mechanism 18, including pinion 19 provided at the other end for enabling the detection of the angular rotation of the shaft.

In operation, the accelerometer mechanism is adapted to be mounted within a movable vehicle with the axis of shaft 16 being oriented in the direction of the acceleration to be detected. The motor 17 is rigidly supported with respect to the vehicle whereby external accelerational forces operating upon the vehicle are transmitted lengthwise along the shaft 16. In response to any such accelerational force, the inertia wheel 12 normally tends to maintain its same orientation in space, but due to the inclined side walls of the helical guide an axial and rotative force is transmitted to the inertia wheel 12 compelling the wheel 12 to rotatably and axially travel along the helix. It has been found that the angular acceleration of the inertial wheel 12 with respect to the helix guide is proportional to the linear accelerational force directed along the axis of shaft 16, and similarly the angular velocity and angular displacement of the inertia wheel 12 is proportional to the linear velocity and linear distance traveled, respectively. Consequently, the mechanism as described is sensitive to acceleration and inherently doubly integrates the acceleration force to produce an output signal proportional to the distance traveled, which output signal is obtained by measuring or detecting the total angular displacement of the inertia wheel with respect to the shaft 16 or cylindrical helix guide member 14.

For any appreciable distance measurement, however, it is apparent the helix guide means 14 required would necessarily be inordinately long since the mass 12 not only rotates but axially travels along the helical guide 14. This difficulty is overcome according to the invention by employing the motor 17 to counterrotate the shaft 16 and helix guide 14 by an angular displacement that is substantially equal and opposite to the angular displacement of the inertia mass 12. In this manner, the axial position of the mass 12 with respect to the helix guide is maintained substantially constant and only a relatively short length helix groove 15 is required.

According to the invention, it is preferred to control this counterrotation function by a simple contact servo mechanism including a pair of spaced electrical contact arms 20 and 21 that are affixed with respect to the shaft 16 and an electrical contact member 22 positioned intermediate the arms 20 and 21 and affixed with respect to the inertia wheel 12. When the inertia wheel 12 is angularly displaced over a small angles in one direction with respect to the shaft 16, the contactor 22 engages arm 21 to energize the motor 17 in such direction as to again center the contactor 22 between the arms 20 and 21. Similarly should the wheel 12 be angularly displaced in the opposite direction, the contactor 22 engages the other arm 20 to reversely energize motor 17 for rotating the shaft 16 in the opposite direction to restore the wheel 12 to its central axial position on the helix guide 14.

The contact arms 20 and 21 are each affixed to a different slip ring 23 and 24, respectively, supported by the shaft 16 but electrically insulated therefrom, which rings in turn are engaged by brushes 25 and 33, thereby providing the necessary connections for reversely energizing the motor 17, as desired. It is believed evident that other known motor control circuits for this purpose may be employed.

Since the angular displacement of the shaft 16 is substantially equal and opposite to that of the inertia wheel 12, its total angular displacement is likewise proportional to the doubly integrated quantity of the distance traveled by the accelerometer along the measuring axis. Therefore to obtain an output signal proportional to the distance, the angular displacement of the shaft 16 is converted into an electrical signal by a read out head.

The preferred read out head mechanism for converting the shaft displacement into an electrical signal may, of course, be an analog device such as a potentiometer or synchro (not shown) but it is preferred to provide a digital read out device, such as a switch type read out head. As shown, the read out head comprises a rotatable drum 26 that is coupled to the shaft 16 for rotation thereby by means of a gear reducing mechanism actuated by the pinion gear 19 located at the right hand end of shaft 16. The gear reduction ratio can be selected to provide any convenient scale factor, such that the drum 26 may be angularly displaced, for example, by only one half revolution for the total contemplated distance of travel of the vehicle. The shaft 16 on the other hand, will rotate for many hundreds of revolutions for each revolution of the drum.

To obtain a multiple place digital output, the drum is provided with a series of separate channels of conducting strips or partial slip rings, such as strips 27, 28, and 29, variously placed about its outer periphery, as shown, with one or more strips for each separate channel. For making electrical contact at predetermined angular displacements of the drum 26, each channel on the drum 26 is provided with a separate brush, such as 30, 31, and 32 for making contact with the conducting strip. As is believed now evident, the arrangement or coding of the individual conducting strips or conducting increments in each channel can be arranged to provide a variety of different forms of output signals in predetermined programs. For example, an electrical contact can be made to the first brush 30 when the accelerometer has traveled for a first given distance, then contact made to the second brush after traveling to a second distance, then contact to the third brush for the next increment of distance and so forth. Many other predetermined programs and digital readouts are of course available with this versatile slip ring drum 26 disclosed.

To increase the accuracy of the instrument and compensate against errors occasioned by roll or rotation of the vehicle about the acceleration responsive axis (shaft 16), there is provided a substantially identical acceleration responsive second half 11 of the instrument, shown at the right hand portion of FIG. 1, and having the corresponding component parts thereof bearing similar numbers to those described followed by the subscript $a$.

The inertia wheel 12a in the second half 11 and the shaft 16a are in coaxial alignment with the corresponding members of the first half 10 whereby the inertia wheel 14a responds to acceleration forces along the same sensitive axis as does inertia wheel 12. The sole functional difference between these two sections of the instrument are that the helical channel 14a in the second section is wound in the opposite angular direction from that of the first section resulting in the second section 11 being in mirror image arrangement to the first section.

As a result when the instrument is subjected to an acceleration along its sensitive axis, the two inertia wheels 12 and 12a are rotated in opposite directions and likewise, the two read out drums are angularly displaced in opposite directions Consequently, the difference in angular displacement between the two drums 26 and 26a provides a measurement of the acceleration forces acting on the masses. On the other hand when the overall instrument is subjected to spin or angular rotation about its sensitive axis (shafts 16 and 16a) there is substantially no relative rotation or angular displacement between the inertia wheels 12 and 12a or the read out drums 26 and 26a whereby the instrument is substantially rendered insensitive to roll or spin.

In the preferred embodiment, the means employed for reading out the difference between the angular displacements of the two drums 26 and 26a is to electrically interconnect the two drums by providing a series of male contacts, such as 35 and 36, at the end face of drum 26 and female contacts, such as 37 and 38 at the confronting end face of drum 26a, which male and female contacts are adapted to slidably engage with one another thereby providing suitable electrical interconnections between the slip ring type conductors on the two drums for differential read out purposes as desired.

To prevent air drag exerted on the inertia wheels 12 and 12a from imposing an external error force, the inertia wheels 12 and 12a are each enclosed within a cylindrical housing 40 and 40a, respectively. These housings, in effect, decouple the inertia wheels and frame of the accelerometer, which coupling would normally impose an appreciable error drag on the wheels at high angular velocities of the wheels.

FIG. 2 illustrates the preferred construction and assembly of the accelerometer parts within its outer casing. As shown the pair of drive motors 17 and 17a are each affixed within end sections 45 and 45a of the casings and intermediate adapting plates 46 and 46a support the gear reducer units within their separate housings 47 and 47a, respectively, and in turn, the drums 26 and 26a. The two sections of the accelerometer are thus assembled and rigidly maintained in axial alignment with the sensitive axis of the accelerometer.

An adapting cylinder 48 is threadedly connected at its opposite ends to the adapting plates 46 and 46a, thereby joining the two sections of the accelerometer together in a rigid manner to withstand large accelerations yet maintain the two sections in end to end alignment, as desired.

For visual observation of the angular positions of the drums 26 and 26a, the adapting cylinder 48 may be constructed of transparent material and the drums 26 and 26a may each be provided with a graduated scale of markings about their peripheries (not shown), being provided in the side-by-side regions 49. The transparent housing cylinder 48 and the graduated markings (not shown) on the drums 26 and 26a are also considered advantages in enabling the angular positions of the drums 26 and 26a to be brought into initial zero alignment when the accelerometer is initially installed for use.

One of the important advantages of the present invention resides in the fact that frictional forces on wheels 12 and 12a and their guide means are substantially compensated by the gravitational forces on the inertia wheels whereby the accelerometer will sensitively respond to small accelerations despite the friction. A simplified example to illustrate this phenomena is the case of a block sliding on an inclined plane. If the angle of inclination of the block is greater than the antitangent of the coefficient of friction, the component of gravity force acting on the block in the direction of the inclined surface becomes great enough to overcome the friction between the block and surface and the block begins to slide down the surface. The net force acting on the block is the resultant of all forces created by gravitational acceleration. Since all the forces are proportional to gravitational acceleration, the friction force which resists sliding, is proportional to, and smaller than, the force causing the block to slide. Therefore, the block will begin to slide in this system regardless of how small the magnitude of the gravitational acceleration. Since a helix is a line in an inclined plane that is wrapped about a cylinder, an analogous situation prevails and the angle of inclination provided by the helix can be similarly adjusted to substantially compensate for the friction. Thus, an inertia wheel supported on a helical guideway is quite sensitive to small acceleration forces exerted along the axis of the helix since the acceleration forces are substantially the same as gravitational forces.

Additionally, this configuration also offers the advantage that such a system is substantially insensitive to cross accelerations transverse to the axis of the helix, since the sum of the torques exerted can be shown to be zero.

For a more rigorous explanation of this phenomena reference is made to the functional diagrams of FIGS. 3 and 4 for an understanding of the vector components of the forces involved.

As shown in FIG. 3, an inertia wheel guided on a helix can be represented in any given position as a mass 50 having a series of inclined outstanding arms or vanes 51 each being supported on an inclined plane 52, with suitable ball bearings or the like 53 being provided to reduce friction.

Presupporting that the axis 54 of the mass is vertical as shown, the downward gravity force on the mass 50 is divided equally among the three supporting arms or vanes 51 and the vertical force at each inclined plane is the gravity force divided by three and indicated by the vertical vector 55.

This vector 55 may be resolved into two components; the first component 56 being normal to the inclined surface of the inclined plane 52 and the second component 57 being in the direction of the inclined plane. The relative magnitude of the first and second component vectors are a function of the angle of inclination of the inclined plane. The frictional force between the vanes or arms 51 and the surface of the inclined plane is, of course, in a direction to prevent movement between these members and therefore may be represented by a force vector 58 in the opposite direction from gravity component vector 57. As is now evident, the angle of inclination of the inclined plane 52 is increased until the gravity component vector 57 is greater than the opposing friction vector 58. When this condition exists, the mass 50 will rotate and measure the external force due to, g, and is highly sensitive to even the smallest forces directed along axis 54 which will cause additional sliding of the arms with respect to the inclined planes 52. In the present invention, the use of a helical guideway provides the same function as the inclined planes 52, thereby resulting in the inertia wheel rotating and axially traveling along the helix in response to very small acceleration forces directed along the axis of the helix. It is believed evident that the use of the ball bearings 53 or other suitable bearing means does not change the vector force relationship stated since such means merely reduces friction between the surfaces and therefore reduces the magnitude of the force vector 58.

By undertaking a rigorous mathematical analysis of the parameters of a helix guide system as shown in FIG. 1 and FIG. 2, it can be demonstrated that the above discussed relationships exist in the system and that the angular extent of rotation of the inertia wheel 12 is directly proportional to the double integral of the acceleration force along the helix axis.

The mathematical relationship relating distance of travel to angular displacement is as follows:

$$\frac{X}{\theta} = \frac{1}{mR\left(\frac{1}{2}\sin 2\phi - \mu \cos^2 \phi\right)} \quad (1)$$

where:

X—is the linear displacement or distance traveled along the helix axis.
θ—is the angular displacement of the inertia wheel 12.
m—is the mass of the inertia wheel.
R—is the effective radius of rotation of the inertia wheel.
φ—is the helix angle.
μ—is the coefficient of friction between the inertia wheel and the helix guideway, e.g., bearing friction.

FIGURES 5 through 8 illustrate another embodiment of this invention in which the inertia weight is supported by air bearing means. In this embodiment the measuring axis is coincident with the longitudinal axis of the shaft and journal bearing 101 of FIGURE 7. The reduced ends 102, 103 of bearing 101 are supported for rotation by bearings 104, 105, respectively, carried by frame 106. Air conduit 107 secured to frame 106 abuts the upper end of bearing portion 102 and communicates with the longitudinal passage 108 which extends for a substantial distance along the axis of bearing 101. A plurality of passages 109 radiate from longitudinal passage 108 and terminate in ports 110. Additional radial passages 111 communicate with longitudinal passage 108 and terminate in ports 112.

The enlarged central portion 113 of bearing 101 is disposed within the central aperture of spool-like sensing element 115 of FIGURE 6 which constitutes the inertial weight. Mounted to bearing 101, at opposite ends of element 115, are oppositely facing helical thrust bearing pads 116 (FIGURE 8). Each pad 116 is a wafer-like member having a depression in a surface thereof with the bottom of this depression being defined by surface 117. With bearing locating pin 118 disposed within the locating hole 119 of surface 117, bearing pad 116 is in correct angular position relative to bearing 101. Retaining screws 120 in engagement with the threaded portion 121 of bearing 101 urge journal bearing shoulder 122 against surface 117 of bearing pad 116. With bearing pad 116 properly mounted to journal bearing 101 ports 112 are in alignment with pad 122 at one end of each pad passage 123. The other ends of pad passages 123 communicate with the passages of air metering plugs 125 which exhaust at helical thrust bearing surfaces 126.

Helical thrust bearing surfaces 126 confront similarly shaped helical thrust bearing surfaces 127 formed in the end surfaces of sensing element 115. It is noted that the ends of sensing element 115 are provided with thin annular enlarged sections 151, 152 and that there is a thin annular enlarged wall 128 substantially midway between sections 151, 152. Wall 128 is provided with a pair of windows 129 which are part of a follow-up servo system including light source 130 and photoelectric pick-off device 131. Elements 130 and 131 are mounted internally of shroud 133 which surrounds sensing element 115. The inwardly turned ends of shroud 131 abut the peripheral edges of pads 116 so as to form substantially fluid-tight joints. When sensing element 115 is rotated relative to bearing 101 aperture 129 is not properly aligned with respect to photoelectric pick-off 131. This creates an unbalanced condition producing an error signal which is fed to the electronic servo means 136 whose output controls the direction of rotation and time of operation for motor 137.

Motor 137 is mounted to one end of frame 106 with motor shaft 138 on the measuring axis. Shaft on 138 is received in a longitudinally extending passage communicating with the free end of bearing reduced portion 103. The connection between shaft 138 and bearing 101 is such that rotation of shaft 138 is effective to rotate shaft and journal bearing 101 as well as all of the other elements mounted thereto. Stationary readout elements 141 are mounted to frame 106 while cooperating movable readout elements 142 are keyed to bearing 101 at its lower end. Slip ring assembly 146 is mounted to the upper end of bearing 101 and cooperates with brush assembly 147 to frame 106 to supply electrical energy to the control elements of the device.

Air under pressure supplied through conduit 107 flows to bearing passage 108 where it is distributed to the various radial passages. This air under pressure then flows out of ports 110 into air bearing slots formed between the inner surface of element 115 and the outer surface of bearing portion 113. Air flowing through communicating passages 111, 123, exits through air metering plugs 125 so as to be especially active in the spaces between helical surfaces 126 and 127 so as to support sensing element 115 relative to helical thrust bearing pads 116.

When the device of FIGURE 5 experiences an acceleration along its measuring axis, a force component is created which acts in a direction to impart limited rotation to sensing element 115. This rotation is relative to bearing 101.

Now window 129 is no longer aligned with respect to photoelectric pick-off 131 so that an appropriate signal is fed to servo 136. The latter in turn supplies a voltage of correct polarity for rotation of motor 137 in a direction which will cause rotation of the shaft and journal bearing 101 to the angular position relative to sensing element 115 where window 129 is in alignment with photoelectric pick-off 131.

Thus it is seen that the embodiment illustrated in FIGURES 5 through 8 fully achieves the purpose of helical bearing surfaces to support the inertia weight of an accelerometer.

Although but one preferred embodiment of the invention has been illustrated and described, many variations may be made by those skilled in the art without departing from the spirit and scope of the invention. Accordingly, this invention should be considered as being limited only by the following claim.

What is claimed is:

A double integrating accelerometer comprising an inertia mass, fluid bearing means freely supporting said mass for rotative movement on a helical guideway about an axis oriented in the direction of acceleration to be measured, and means for detecting the angular displacement of said mass about said axis thereby to determine the double integral of acceleration along said axis, said guideway comprising means defining first helical surfaces at opposite ends of said inertia mass and means defining second helical surfaces confronting said first helical surfaces, said fluid bearing means including conduits for directing fluid under pressure into spaces between said first and said second helical surfaces whereby said inertia mass is supported relative to said second helical surfaces on a fluid cushion, spin separating movement means for separating angular movements of said mass with respect to said guideway resulting from spin of said accelerometer about its sensitive axis from angular movements thereof resulting from acceleration along said sensitive axis, said spin separating movement means including an additional inertia mass, means for supporting said mass for rotation about a helical guideway having the same axis as the first mentioned guideway means but in an opposite rotative direction therefrom, and means for detecting the difference in angular displacement of said mass and additional mass as a function of the linear acceleration along said axis.

References Cited by the Examiner

UNITED STATES PATENTS

| | | | |
|---|---|---|---|
| 2,163,731 | 6/1939 | Hallot | 188—181 |
| 2,427,239 | 9/1947 | Taylor | 73—514 |
| 2,656,175 | 10/1953 | Lee | 73—511 |
| 2,958,137 | 11/1960 | Mueller | 73—516 |
| 2,959,057 | 11/1960 | Winker | 73—516 |
| 3,066,540 | 12/1962 | Severance | 73—503 |
| 3,148,547 | 9/1964 | Angele | 73—490 |

FOREIGN PATENTS

| | | |
|---|---|---|
| 1,060,073 | 11/1953 | France. |
| 3,129,592 | 4/1964 | Germany. |

OTHER REFERENCES

German application 1,124,745, March 1, 1962.

RICHARD C. QUEISSER, *Primary Examiner.*

ROBERT L. EVANS, *Examiner.*

JAMES J. GILL, *Assistant Examiner.*